United States Patent [19]
Disser et al.

[11] Patent Number: 5,900,712
[45] Date of Patent: May 4, 1999

[54] TRANSISTOR DRIVE CIRCUIT AND CONTROL FOR A SWITCHED RELUCTANCE MOTOR

[75] Inventors: Robert John Disser, Dayton; Patrick Allen Mescher, Bellbrook, both of Ohio

[73] Assignee: General Motors Corporation, Detroit, Mich.

[21] Appl. No.: 09/027,494

[22] Filed: Feb. 20, 1998

[51] Int. Cl.[6] ........................................... H02P 5/28
[52] U.S. Cl. ............................. 318/701; 318/254
[58] Field of Search ................... 318/701, 254, 318/439, 138, 685, 696

[56] References Cited

U.S. PATENT DOCUMENTS

| | | | |
|---|---|---|---|
| 3,697,840 | 10/1972 | Koch | 318/138 |
| 4,835,408 | 5/1989 | Ray et al. | 307/24 |
| 5,289,107 | 2/1994 | Radun et al. | 322/94 |
| 5,479,080 | 12/1995 | Jones et al. | 318/701 |
| 5,689,164 | 11/1997 | Hoft et al. | 318/701 |
| 5,705,918 | 1/1998 | Davis | 318/701 |
| 5,847,532 | 12/1998 | Webster | 318/701 |

OTHER PUBLICATIONS

SRM Inverter Topologies : A Comparative Evaluation; S. Vukosavic & V.R. Stefanovic—1990 IEEE; pp. 949–954.
A Modified C–Dump Converter for Variable–Reluctance Machines; A. M. Hava; 1992 IEEE—pp. 1017–1021

*Primary Examiner*—Jonathan Salata
*Attorney, Agent, or Firm*—Anthony L. Simon; Robert M. Sigler

[57] ABSTRACT

A low cost switched reluctance motor drive circuit is achieved by establishing an alternate supply bus which effectively extends the voltage range of the DC supply for the drive. The alternate bus is maintained at a voltage which is either higher or lower than the supply voltage. A first capacitor is connected in parallel with the supply voltage and a second capacitor is connected between the alternate bus and one terminal of the supply voltage. At least one of the motor phase windings is connected in parallel with the first capacitor and at least one other of the phase windings is connected in parallel with the second capacitor. The phase winding(s) drawing energy from the first capacitor return inductive current to the second capacitor, and the phase winding(s) drawing energy from the second capacitor return inductive current to the first capacitor. A voltage regulation control ensures that the alternate bus voltage is maintained at a desired value so that the full supply voltage is available for energizing each of the phase windings. In a preferred embodiment, one or more of the free-wheeling diodes are replaced with a power transistor so that the respective phase winding may be selectively connected in parallel with either of the first and second capacitors for purposes of regulating the voltage of the alternate bus. In this case, a selected one of the transistors is controlled to energize the phase winding, and the other transistor performs the function of a free-wheeling diode.

14 Claims, 5 Drawing Sheets

TRANSISTOR DRIVE CIRCUIT AND CONTROL FOR A SWITCHED RELUCTANCE MOTOR

This invention relates to transistor drive circuits and the control of switched reluctance motors, and more particularly to drive circuits having a reduced number of power switching devices without sacrificing motor performance.

BACKGROUND OF THE INVENTION

Drive circuits for switched reluctance motors are comprised of power switching devices and diodes for sequentially energizing the motor phase windings, with or without overlap, in accordance with the position of the rotor to produce a rotating magnetic field that interacts with the rotor poles to produce torque of a desired direction and magnitude.

The standard drive circuit topology includes two power transistors and two power diodes per motor phase. FIG. 1 shows the standard drive circuit topology as applied to two phases of a polyphase machine. Power is supplied to the motor phase windings A and B from a DC source such as battery 10, the winding A being connected across battery 10 by transistors 12 and 14, and the winding B being connected across battery 10 by transistors 16 and 18. Free-wheeling diodes 20–26 circulate inductive current in the respective phase windings when one or both of the respective transistors are turned off. In operation, a given phase winding is energized by turning on the upper and lower transistors associated with that phase. For example, winding A is energized by turning on transistors 12 and 14. Current in the phase winding is regulated by pulse-width-modulating (PWM) either of the upper and lower transistors while the other transistor is maintained conductive, the winding current during off periods of the PWM being re-circulated through the conductive transistor and one of the free-wheeling diodes 20 or 22. When both upper and lower transistors are turned off to terminate the energization interval, both free-wheeling diodes 20 and 22 conduct to return the winding current to battery 10. This allows the winding voltage to rise slightly higher than the voltage of battery 10, and the current quickly collapses.

A number of alternate drive circuit topologies have been developed in an effort to reduce the number of power devices, and therefore, the cost of the drive circuit. A prior art circuit which halves the number of transistors and diodes is shown in FIG. 2. This drive circuit, sometimes referred to as a split-link circuit, reduces the number of power devices by using the capacitors C1 and C2 to establish an intermediate voltage link or bus 40, the phase windings being connected between the bus 40 and one of the positive or negative terminals of battery 10 by a respective transistor. In FIG. 2, phase winding A is connected between bus 40 and the positive battery terminal by transistor 42, while winding B is connected between bus 40 and the negative battery terminal by transistor 44. The phase winding A is connected in parallel with capacitor C1, and returns inductive energy at commutation to capacitor C2 via free-wheeling diode 46. Conversely, the phase winding D is connected in parallel with capacitor C2, and returns inductive energy at commutation to capacitor C1 via free-wheeling diode 48. One such circuit, described in the U.S. Pat. No. 4,835,408 to Ray et al., additionally includes circuitry for regulating the voltage on the intermediate bus 40 by suitably adjusting the conduction period of one or more of the phase windings. While such topologies are advantageous for their reduced number of power transistors and diodes per phase, only one-half of the supply voltage is available for energizing the phase windings. As a result, the efficiency of the drive is reduced due to increased switching and conduction losses, and the performance of the motor is degraded, especially in high speed operation.

SUMMARY OF THE PRESENT INVENTION

The present invention is directed to an improved switched reluctance motor drive circuit having a reduced number of power devices and an alternate link or supply bus which effectively extends the voltage range of the supply. The result is a low cost drive topology that avoids the disadvantages of split-link drive circuits.

According to this invention, the alternate bus is maintained at a voltage which is either higher or lower than the supply voltage. A first capacitor is connected in parallel with the supply voltage and a second capacitor is connected between the alternate bus and one terminal of the supply voltage. At least one of the motor phase windings is connected in parallel with the first capacitor and at least one other of the phase windings is connected in parallel with the second capacitor. The phase winding(s) drawing energy from the first capacitor return inductive current to charge the second capacitor, and the phase winding(s) drawing energy from the second capacitor return inductive current to charge the first capacitor. A voltage regulation control adjusts the current in one or more of the phase windings to maintain the alternate bus voltage at a desired value so that the full supply voltage is available for energizing each of the phase windings.

The preferred embodiments of this invention replace one or more of the free-wheeling diodes with a power transistor so that the respective phase winding may be selectively connected in parallel with either the first or second capacitor. A selected one of the transistors is controlled to energize the phase winding, and the other transistor performs the function of a free-wheeling diode. In these embodiments, voltage regulation of the alternate bus is achieved by controlling which bus sources current to one or more active phase windings, significantly increasing the regulating capability without increasing the total number of power devices.

DETAILED DESCRIPTION OF THE DRAWINGS

The drive circuits according to this invention, several different embodiments of which are depicted in FIGS. 3–8, in general comprise a total of two power devices per motor phase winding. Due to the alternate bus topology and the voltage regulation thereof, the energization voltage for each of the phase windings is at least as high as the DC supply voltage. The result is a low cost drive circuit with performance advantages compared to previously known drive topologies. The various embodiments are depicted in four-phase and three-phase implementations, but obviously could be extended to motors having a different number of phase windings.

Figure 1:
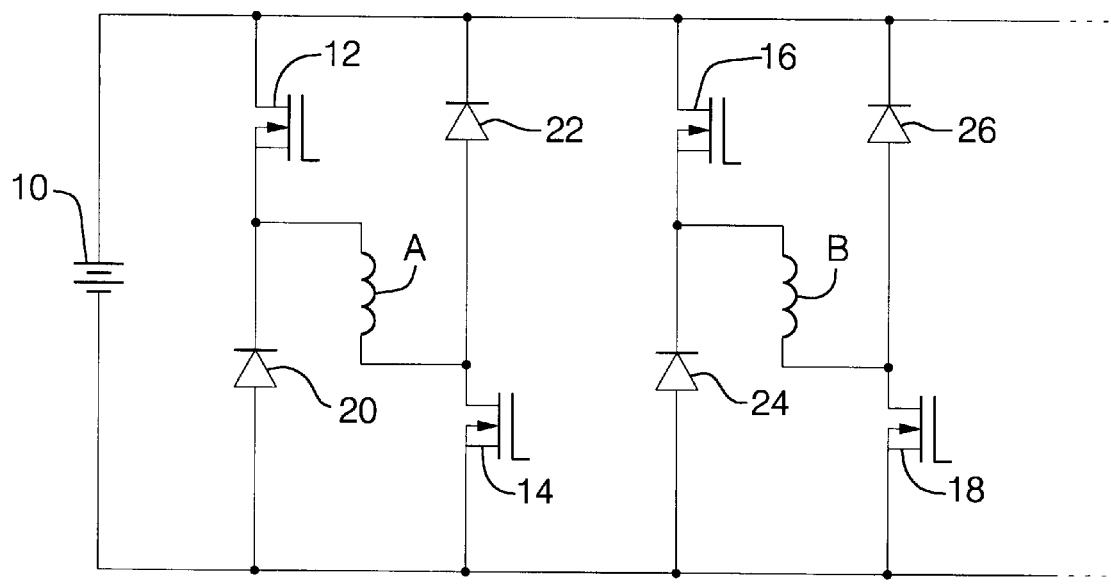
FIG. 1 is a circuit diagram of a prior art drive circuit for a switched reluctance motor, including two power transistors and two diodes per phase winding.
Figure 2:
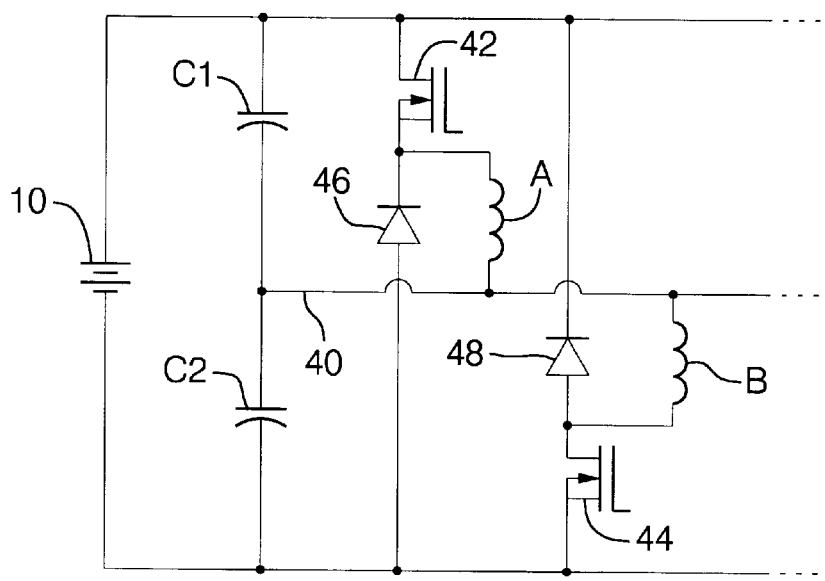
FIG. 2 is a circuit diagram of a prior art split-link drive circuit for a switched reluctance motor, including one power transistor and one diode per phase winding.
Figure 3:
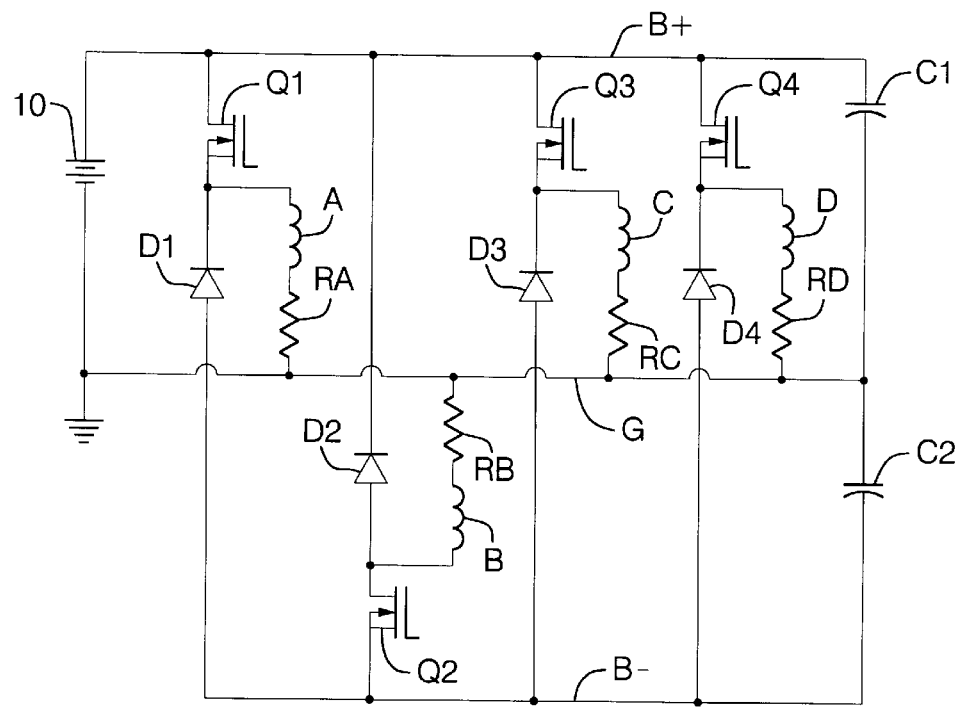
FIG. 3 is a circuit diagram of a drive circuit for a four-phase switched reluctance motor according to a first embodiment of this invention, and having an alternate bus voltage which is lower than the supply voltage.

The drive circuit of FIG. 3 represents the first embodiment of this invention, as applied to a four-phase switched reluctance motor, and includes a total of four power transistors Q1–Q4 and four free-wheeling diodes D1–D4, in addition to the two capacitors C1 and C2. The capacitor C1 is connected between the positive bus B+ and the ground bus G, defined by the positive and negative terminals of DC source 10, which may be a conventional automotive storage battery, or a source of rectified AC. The capacitor C2, on the other hand, is connected between the ground bus G and an alternate bus, also referred to herein as the negative, or B−, bus. In the illustrated embodiment, phase windings A, C and D are connected in parallel with battery 10 and capacitor C1 by the power transistors Q1, Q3 and Q4, respectively, and phase winding B is connected in parallel with capacitor C2 by the power transistor Q2. Current sensing resistors RA–RD connected between the respective phase windings A–D and the ground bus G are used to detect the respective phase winding currents, and the associated power transistors Q1–Q4 are chopped or pulse-width-modulated to control the phase winding currents to the desired levels.

The free-wheeling diodes D1–D4 direct inductive currents stored in the respective phase windings A–D to one of the capacitors C1, C2 or to another phase winding currently being energized. For example, free-wheeling diode D1 operates during PWM of power transistor Q1, and at the end of the phase-A conduction period, to circulate the inductive current of phase winding A through capacitor C2. Or, if transistor Q2 happened to be conductive at the time, the inductive current of phase winding A could be circulated through phase winding B instead of or in addition to capacitor C2. Free-wheeling diodes D3 and D4 for phase windings C and D operate in the same manner as described for free-wheeling diode D1. In an analogous manner, free-wheeling diode D2 operates during PWM of power transistor Q2, and at the end of the phase-B conduction period, to circulate the inductive current of phase winding B through capacitor C1, and/or phase windings A, C or D if the respective transistor Q1, Q3 or Q4 happens to be conducting.

Significantly, the negative bus B− assumes a voltage outside the range of battery 10, as though there were another DC source connected in parallel with capacitor C2. However, only one source is required, and the alternate bus voltage is developed by the transfer of inductive energy from the phase windings A, C and D to capacitor C2, as described above. Thus, the full source voltage of battery 10 is available to energize phase windings A, C and D, and the full voltage of capacitor C2 is available to energize phase winding B.

The available voltage across capacitor C2—i.e., the alternate B− bus voltage—is regulated by monitoring the bus voltage, and suitably adjusting the respective winding current levels, phase conduction intervals, or a known motor load characteristic which does not need regulation. For example, if the alternate bus voltage is too low, the conduction interval for phase winding B could be decreased, and the conduction interval for phase windings A, C and D increased, thereby increasing the net energy transfer to capacitor C2.

It will be understood, of course, that a phase winding other than winding B could be connected in parallel with capacitor C2. Also in certain situations, two or more of the phase windings could be connected in parallel with capacitor C2, particularly in mechanizations involving more than four phase windings.

Figure 4:
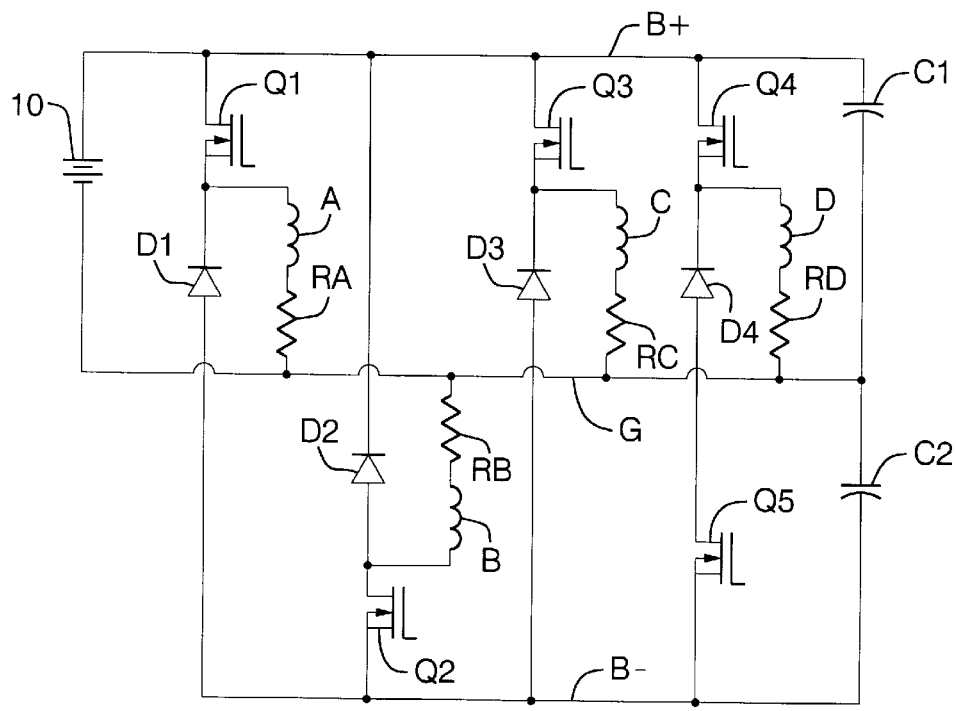
FIG. 4 is a circuit diagram of a drive circuit for a four-phase switched reluctance motor according to a second embodiment of this invention, and having an alternate bus voltage which is lower than the supply voltage.

The drive circuit of FIG. 4 represents a second embodiment of this invention, as applied to a four-phase switched reluctance motor, and includes a total of five power transistors Q1–Q5 and three free-wheeling diodes D1–D3, in addition to the two capacitors C1 and C2. In the illustrated embodiment, the free-wheeling diode D4 of the first embodiment drive circuit of FIG. 3 has been replaced by the fifth power transistor Q5. Otherwise, the drive circuit topologies of FIGS. 3 and 4 are essentially the same, and the characteristics common to both topologies will not be repeated here. In this drive circuit, the controller has the freedom to selectively connect the phase winding D in parallel with either capacitor C1 or capacitor C2. If transistor Q4 is biased on to connect winding D in parallel with capacitor C1, the transistor Q5 operates as a free-wheeling diode, circulating the inductive energy stored in winding D through capacitor C2, or possibly phase winding B if transistor Q2 is conductive at the time. If transistor Q5 is biased on to connect winding D in parallel with capacitor C2, the transistor Q4 operates as a free-wheeling diode, circulating the inductive energy stored in winding D through capacitor C1, or possibly phase windings A or C if transistors Q1 or Q3 are conductive at the time. This control flexibility is used, according to this invention, to regulate the voltage of the alternate bus B−. To illustrate, suppose that under certain load conditions, phase D is drawing power from the B+ bus; this occurs when transistor Q4 is biased on, as described above. If the controller determines that the B− bus voltage is too highly negative, the controller can begin energizing phase winding D from the negative bus B− by turning on transistor Q5 instead of transistor Q4. In this case, phase winding D draws energy from the negative bus B− instead of supplying energy to it, thereby pulling the B− bus voltage closer to ground, and within a regulating window about a desired voltage level. While it is possible to change from one bus to the other during the conduction period of a given phase winding, the change is ideally initiated at the normal commutation time of the winding.

Figure 5:
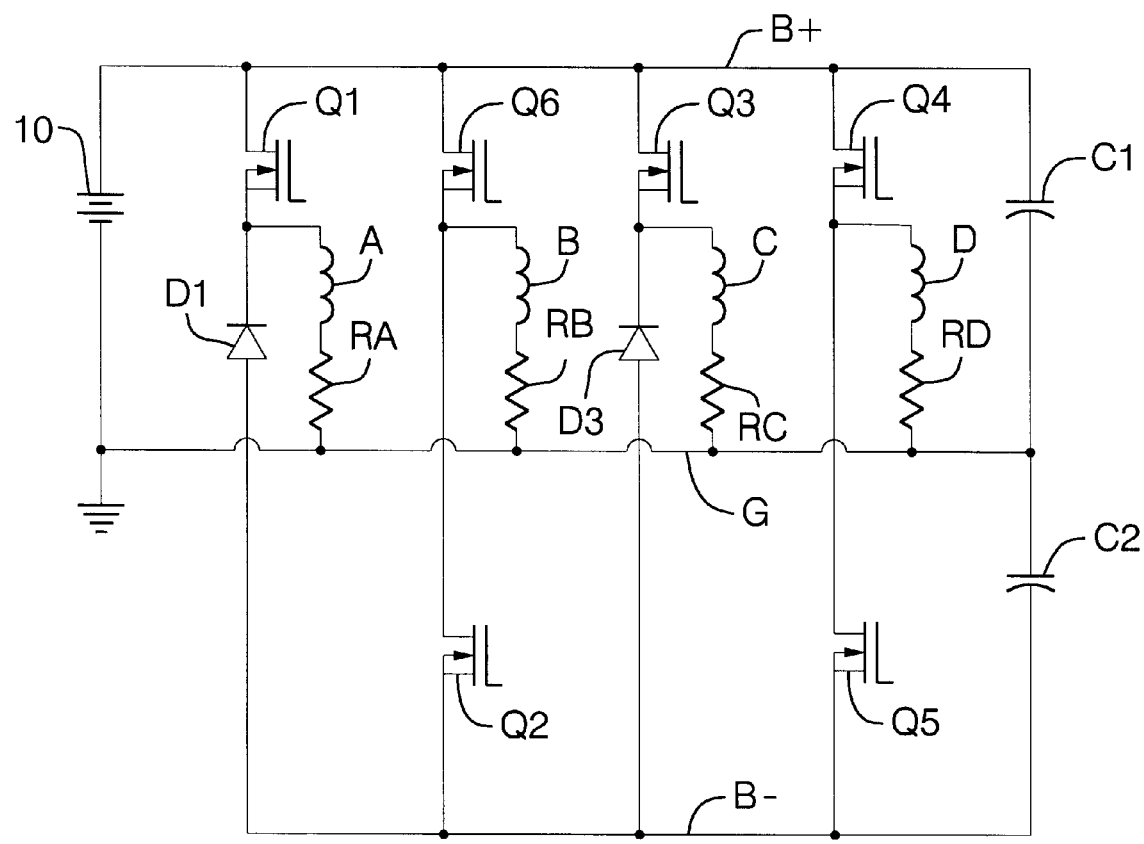
FIG. 5 is a circuit diagram of a drive circuit for a four-phase switched reluctance motor according to a third embodiment of this invention, and having an alternate bus voltage which is lower than the supply voltage.

The drive circuit of FIG. 5 represents a third embodiment of this invention, as applied to a four-phase switched reluctance motor, and includes a total of six power transistors Q1–Q6 and two free-wheeling diodes D1–D2, in addition to the two capacitors C1 and C2. The illustrated drive circuit differs from the drive circuit of FIG. 4 in that the free-wheeling diode D2 has been replaced by the sixth power transistor Q6. Otherwise, the drive circuit topologies of FIGS. 4 and 5 are essentially the same, and the characteristics common to both topologies will not be repeated here. In this drive circuit, the controller has the freedom to select the source bus for both phase windings B and D. Thus, transistor Q6 can be biased on to connect winding B in parallel with capacitor C1, with the transistor Q2 operating as a free-wheeling diode, circulating the inductive energy stored in winding B through capacitor C2, or possibly phase winding D if transistor Q5 is conductive at the time. If transistor Q2 is biased on to connect winding B in parallel with capacitor C2, the transistor Q6 operates as a free-wheeling diode, circulating the inductive energy stored in winding B through capacitor C1, or possibly phase windings A, C or D if transistors Q1, Q3 or Q4 are conductive at the time. The increased flexibility offered by this topology enables more effective regulation of the negative bus voltage, and is particularly beneficial in situations where low speed-high torque operation of the motor is important.

Figure 6:
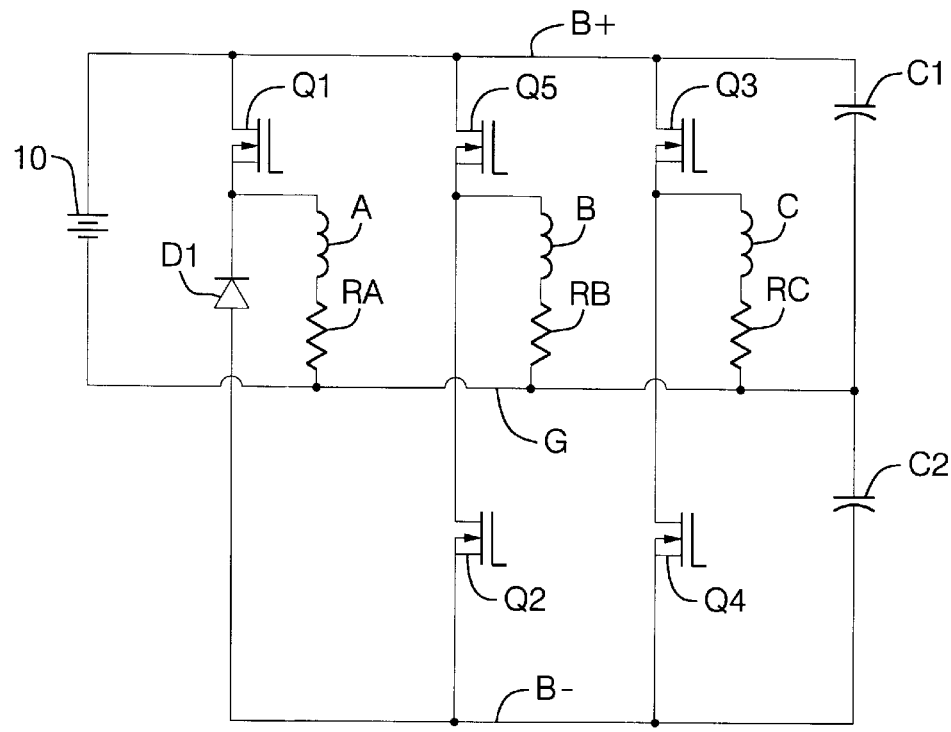
FIGS. 6–7 are circuit diagrams of drive circuits for a three-phase switched reluctance motor according to this invention, and having an alternate bus voltage which is lower than the supply voltage.

The drive circuit of FIG. 6 is directed to the control of a three-phase switched reluctance motor, but otherwise is analogous to the drive circuit of FIG. 5, where two of the phase windings are selectively connectable to draw current from either positive bus B+ or negative bus B−. In general, the operation of this drive circuit is analogous to or the same as the driver circuit of FIG. 5, and accordingly, is not discussed in detail here.

Figure 7:
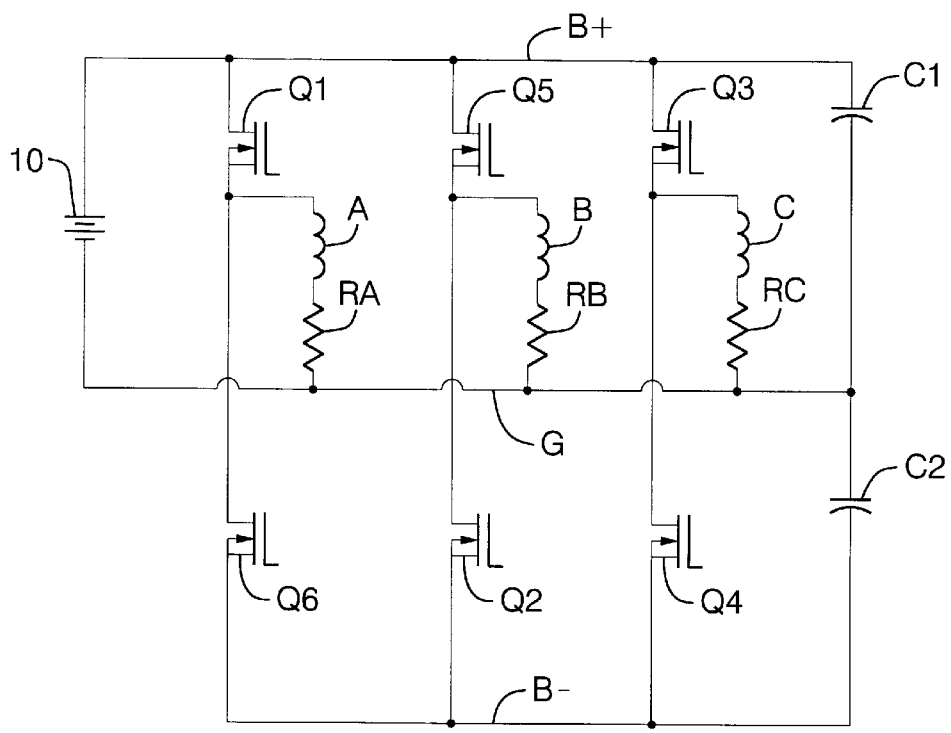

The drive circuit of FIG. 7 is also directed to the control of a three-phase switched reluctance motor, but in this case, all three of the motor phase windings A–C are selectively connectable to draw current from either positive bus B+ or negative bus B−. In general, however, the operation of this drive circuit is analogous to or the same as the driver circuit of FIG. 5, and accordingly, is not discussed in detail here.

Figure 8:
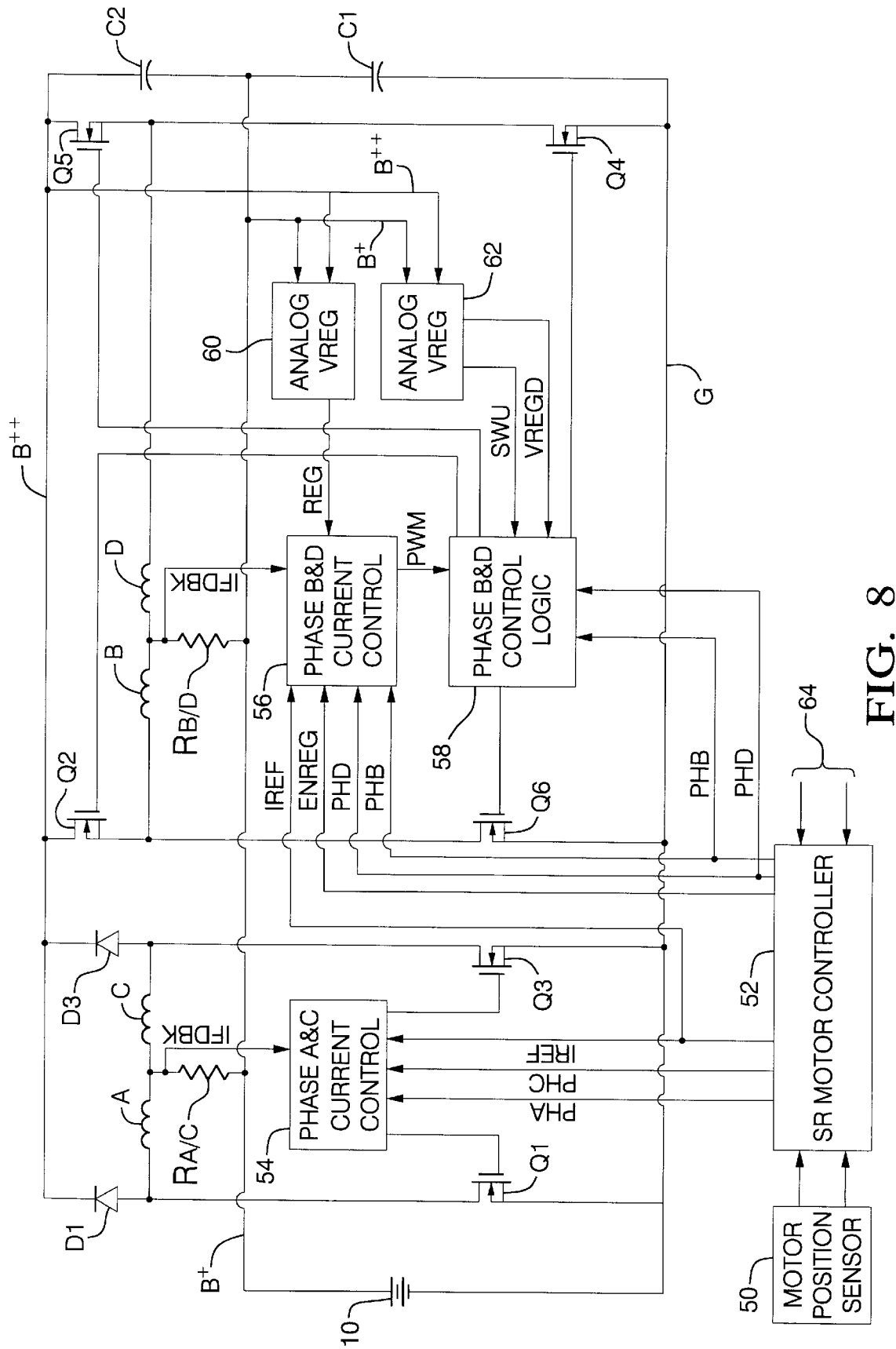
FIG. 8 is a diagram of a drive circuit and controller for a four-phase switched reluctance motor, and having an alternate bus voltage which is higher than the supply voltage.

In each of the above-described embodiments, the alternate bus voltage developed across capacitor C2 has been illustrated as a negative bus voltage B−. However, the opposite implementation is also possible, where the alternate bus is maintained at a B++ voltage which is higher, with respect to ground bus G, than the voltage of bus B+. FIG. 8 depicts such an implementation, as applied to the drive circuit topology of FIG. 5. Here, the capacitor C2 is connected between the B+ and B++ buses to define the alternate bus voltage B++, and the power devices couple the windings to the B++ bus and the ground bus G. The windings A and C are selectively coupled to the ground bus G by a respective power transistor Q1, Q2, and to the B++ bus by a respective free-wheeling diode D1, D3. The windings B and D are selectively coupled to the ground bus G by a respective power transistor Q6, Q4 and to the B++ bus by a respective power transistor Q2, Q5. As in the drive circuit of FIG. 5, the controller has the freedom to select the source bus for both phase windings B and D. The switching operation is essentially the same as for FIG. 5, and is not repeated here. It will be noted in FIG. 8 that the current sensing resistors RA and RC have been combined into a single sensing resistor RA/C; and that the current sensing resistors RB and RD have been combined into a single sensing resistor RB/D. This simplification is possible in mechanizations where the energization periods for windings A and C, and for windings B and D, are mutually exclusive.

FIG. 8 also shows a circuit diagram of a controller for operating the transistors Q1–Q6. The controller includes a motor position sensor 50, a motor controller 52, a current control circuit 54 for phases A and C, a current control circuit 56 for phases B and D, a control logic circuit 58 for phases B and D, an analog voltage regulation circuit 60 for phases B and D, and a digital voltage regulation circuit 62 for phases B and D. The motor controller 52 receives motor position information from the position sensor 50, along with other inputs 64 indicative of the desired motor speed or torque, and generates reference current IREF and conduction period signals PHA, PHB, PHC and PHD for the current control circuits 54 and 56. The current control circuits 54 and 56 also receive winding current feedback signals IFDBK from the respective sensing resistors RA/C, RB/D, and operate, in general, to develop suitable PWM control signals for the respective power transistors Q1–Q6 based on the deviation of the actual winding currents from the reference current IREF. These control functions are well known and understood in the motor control art, and are not described in further detail here.

The remaining elements of the controller concern voltage regulation of the alternate bus B++. Ordinarily, the B and D phase windings are coupled across capacitor C2 during their respective conduction periods. This represents a balanced condition in which windings A and C discharge capacitor C1, and return stored inductive energy as charging current to capacitor C2; and in which windings B and D discharge capacitor C2, and return stored inductive energy as charging current to capacitor C1. The objective of the voltage regulating elements is to maintain the alternate bus voltage B++ at or near its nominal voltage, approximately twice the source voltage B+, with respect to the ground bus G. According to the preferred embodiment of this invention, the voltage regulation can be achieved by using one of three different control modes.

The first control mode, referred to herein as analog voltage regulation, is used when the motor is stopped, or when the motor speed relatively low (less than 500–1500 RPM), and the command request is to stop the motor. Under these conditions, the conduction periods for windings A or C, and B or D, overlap, and the winding current in phases B or D is reduced such that the inductive energy returned to the B++ bus by phase windings A or C is sufficient to support the energy absorbed by phases B or D. As an example, assume that the reference current IREF developed by controller 52 is 10 amps from each of the two windings that are conducting current to produce a required torque. Windings A or C will continue to conduct 10 amps as the motor stops, but the current in windings B or D is reduced to, say 7 amps, so that the energy returned to alternate bus B++ is equal to the energy consumed by the winding B or D. If additional torque is required because of the current reduction, the controller 52 may increase the current request to 12 amps, allowing windings A or C to conduct 12 amps, while windings B or D conduct, say 9 amps, to produce the required torque while maintaining the alternate bus voltage B++ at its nominal value. At the circuit level, the controller 52 provides an enable signal ENREG to the current control circuit 56, which enables the reduction of phase winding current based on a regulation signal REG generated by analog voltage regulation circuit 60. The regulation signal REG is based on a comparison of the B+ and B++ bus voltages, and operates when enabled to bias the current reference signal IREF in a direction to suitably reduce the duty cycle of PWM for the B or D phase windings. The PWM control signal is supplied to the control logic circuit 58, which controls the gating of the power transistors Q2, Q4, Q5 and Q6.

The second control mode, referred to herein as primary digital regulation, is used in normal running operation when the motor speed is 400–500 RPM or higher. In such operation, the commutation rate of the phase windings is sufficiently high that the alternate bus voltage B++ can be regulated by selectively coupling the B or D phase windings to the B++ or G buses. The digital voltage regulation circuit 62 compares the B+ and B++ bus voltages and provides a bus switch control output SWU to control logic circuit 58 that indicates whether the B++ bus voltage is above or below its nominal value. If the SWU output indicates that the alternate bus voltage is too low, the control logic circuit 58 will initiate the next conduction period for the B or D phase windings by gating on the respective power transistor Q6 or Q4 to return energy to the B++ bus. Conversely, if the SWU output indicates that the alternate bus voltage is too high, the control logic circuit 58 will initiate the next conduction period for the B or D phase windings by gating on the respective power transistor Q2 or Q5 to return energy to the B+ bus. At the circuit level, this control logic can be simply achieved with conventional logic gates and flip-flops. Alternately, of course, the function of some or all of the control circuitry described herein could be performed in software by a suitably programmed micro-controller.

The third control mode, referred to herein as secondary digital regulation, is used in low speed running operation below 400–500 RPM. Under these conditions, the commutation rate of the phase windings is relatively low, and more immediate switching action may be required to keep the alternate bus voltage B++ within maximum and minimum limit values. In a mechanization having a nominal alternate bus voltage of 15 volts, the minimum limit value was set at 6 volts, and the maximum limit value was set at 23 volts. The digital voltage regulation circuit 62 monitors the bus voltage, and if either of these limits are reached, supplies a secondary voltage regulation signal VREGD to control logic circuit 58 indicating which limit was reached. When the VREGD signal is generated, the control logic circuit responds by immediately controlling the power transistors Q2, Q4, Q5 and Q6 to correct the over-voltage or under-voltage. Thus, if transistor Q6 is on to energize winding B from the G bus when the VREGD signals an over-voltage of alternate bus B++, the control logic will immediately turn off transistor Q6, and turn on transistor Q2. In practice, it has been found that the alternate bus voltage can ordinarily be maintained by switching from one bus to the other in time with the scheduled commutation intervals in accordance with the primary digital regulation mode, and the secondary digital regulation mode is used very little.

In summary, the present invention provides a novel motor drive circuit topology having a reduced number of power devices and an alternate supply bus which effectively extends the range of the supply without suffering the performance losses of prior art drive circuit topologies. The power devices are arranged to enable simple but accurate voltage regulation of the alternate bus in various operating modes of the motor.

While this invention has been described in reference to the illustrated embodiments, it will be understood that various modifications and design variations will occur to those skilled in the art, and that drive circuits and controls incorporating such modifications may fall within the scope of this invention, which is defined by the appended claims.

The embodiments of the invention in which an exclusive property or privilege is claimed are defined as follows:

1. A drive circuit for energizing the phase windings of a multiple phase switched reluctance motor, comprising:
    a DC source having a first terminal defining a first supply bus and a second terminal defining a second supply bus, each of said phase windings having a first end connected to said second supply bus, and a second end;
    a first capacitor connected between said first and second supply buses;
    a third supply bus;
    a second capacitor connected between said second and third supply buses;
    first switching means coupled to the second end of one or more phase windings comprising a first set of phase windings for individually connecting such phase windings to said first supply bus to effect a normal control wherein such phase windings draw energy from said first capacitor and return stored inductive energy to said second capacitor, thereby to develop a third supply bus voltage across said second capacitor; and
    second switching means coupled to the second end of one or more phase windings comprising a second set of phase windings for individually connecting such phase windings to said third supply bus to effect a normal control wherein such phase windings draw energy from said second capacitor and return stored inductive energy to said first capacitor.

2. The drive circuit of claim 1, further comprising:
    control means for controlling said first and second switching means in accordance with motor position and a phase winding current command, for sensing said third supply bus voltage; and for adjusting the control of at least one of said first and second switching means when said sensed voltage deviates from a reference voltage so as to drive said sensed voltage toward said reference voltage.

3. The drive circuit of claim 1, wherein said second switching means additionally includes means for individually connecting the second end of a selected one or more of the phase windings of said second set to said first supply bus to effect an alternate control wherein said selected phase windings draw energy from said first capacitor and return stored inductive energy to said second capacitor.

4. The drive circuit of claim 3, further comprising:
    control means for sensing said third supply bus voltage; comparing said sensed voltage to a desired voltage, operating said first switching means in accordance with said normal control when said sensed voltage is greater than said desired voltage, and operating said first switching means in accordance with said alternate control when said sensed voltage is less than said desired voltage.

5. The drive circuit of claim 4, wherein said control means controls said first and second switching means to commutate said phase windings in accordance with motor position, and wherein changes in operation between said normal and alternate controls occur in synchronism with the commutation of said phase windings.

6. The drive circuit of claim 5, wherein changes in operation between said normal and alternate controls occur immediately and without regard to the commutation of said phase windings when said sensed voltage reaches predefined limit values.

7. The drive circuit of claim 1, wherein said first switching means additionally includes means for individually connecting the second end of a selected one or more of the phase windings of said first set to said third supply bus to effect an alternate control wherein said selected phase windings draw energy from said second capacitor and return stored inductive energy to said first capacitor.

8. The drive circuit of claim 7, further comprising:
    control means for sensing said third supply bus voltage; comparing said sensed voltage to a desired voltage, operating said second switching means in accordance with said normal control when said sensed voltage is less than said desired voltage, and operating said second switching means in accordance with said alternate control when said sensed voltage is greater than said desired voltage.

9. The drive circuit of claim 1, wherein said third supply bus voltage is higher than the voltage of said DC source.

10. The drive circuit of claim 1, wherein said third supply bus voltage is lower than the voltage of said DC source.

11. A drive circuit for energizing the phase windings of a multiple phase switched reluctance motor, comprising:

- a DC source having a first terminal defining a first supply bus and a second terminal defining a second supply bus, each of said phase windings having a first end connected to said second supply bus, and a second end;
- a first capacitor connected between said first and second supply buses;
- a third supply bus;
- a second capacitor connected between said second and third supply buses;
- one or more power transistors coupled to the second end of one or more phase windings comprising a first set of phase windings for individually connecting such phase windings to said first supply bus, and effective when conductive to energize said such individual phase windings with current from said first capacitor;
- one or more diodes coupling the individual phase windings of said first set to said second capacitor for returning inductive energy stored in said such phase windings to said second capacitor, thereby to develop a third supply bus voltage across said second capacitor;
- one or more power transistors coupled to the second end of one or more phase windings comprising a second set of phase windings for individually connecting such phase windings to said third supply bus, and effective when conductive to energize said such individual phase windings with current from said second capacitor; and
- one or more diodes coupling the individual phase windings of said second set to said first capacitor for returning inductive energy stored in said such phase windings to said first capacitor.

12. A drive circuit for energizing the phase windings of a multiple phase switched reluctance motor, comprising:

- a DC source having a first terminal defining a first supply bus and a second terminal defining a second supply bus, each of said phase windings having a first end connected to said second supply bus, and a second end;
- a first capacitor connected between said first and second supply buses;
- a third supply bus;
- a second capacitor connected between said second and third supply buses;
- N pairs of power transistors coupled to the second ends of N phase windings, each such pair of transistors including a first transistor for connecting the respective phase winding in parallel with said first capacitor, and a second transistor for connecting the respective phase winding in parallel with said second capacitor;
- sensor means for sensing said third supply bus voltage; and
- a controller connected to said pairs of power transistors for activating a selected one of said first and second transistors of each pair to sequentially energize said phase windings, said controller selecting more first transistors than second transistors when said sensed voltage is less than a desired reference voltage, and more second transistors than first transistors when said sensed voltage is greater than said desired reference voltage.

13. The drive circuit of claim 12, wherein said controller controls said pairs of switching transistors to commutate said phase windings in accordance with motor position, and wherein changes in the selection of said first and second transistors occur in synchronism with the commutation of said phase windings.

14. The drive circuit of claim 13, wherein changes in the selection of said first and second transistors occur immediately and without regard to the commutation of said phase windings when said sensed voltage reaches predefined limit values.

* * * * *